US006859638B2

(12) United States Patent
Nobe

(10) Patent No.: US 6,859,638 B2
(45) Date of Patent: Feb. 22, 2005

(54) ORIGINAL DOCUMENT TRAY FOR SCANNING AND PRINTING APPARATUS

(75) Inventor: Hiroshi Nobe, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 10/704,540

(22) Filed: Nov. 12, 2003

(65) Prior Publication Data
US 2004/0096252 A1 May 20, 2004

(30) Foreign Application Priority Data
Nov. 15, 2002 (JP) .................................... 2002-332296

(51) Int. Cl.[7] .................... G03G 15/00; B41J 11/48; B65H 3/44
(52) U.S. Cl. .................... 399/377; 399/365; 399/361; 399/124; 400/601; 400/622; 400/624; 271/3.01; 271/9.09; 271/9.11
(58) Field of Search .................... 399/377, 365, 399/361, 124; 400/601, 622, 624; 271/3.01, 9.09, 9.11

(56) References Cited

U.S. PATENT DOCUMENTS 5,478,162 A * 12/1995 Nakayama et al. ......... 400/605
6,266,512 B1 * 7/2001 de Koning et al. ......... 399/370
6,279,900 B1 * 8/2001 Yamagishi ................... 271/240
6,536,968 B2 * 3/2003 Lee et al. .................... 400/624

FOREIGN PATENT DOCUMENTS

JP B2 5-62335 9/1993

* cited by examiner

*Primary Examiner*—Andrew H. Hirshfeld
*Assistant Examiner*—Marvin P. Crenshaw
(74) *Attorney, Agent, or Firm*—Oliff & Berridge, PLC

(57) ABSTRACT

An original document tray for a scanning and printing apparatus includes original document guides for guiding an original document in the original document tray into a scanning unit by determining or regulating a widthwise position of the original document, and manual-feed sheet guides provided with the original document tray for guiding a manual-feed sheet to be supplied to a printing unit by determining a widthwise position of the manual-feed sheet. The manual-feed sheet guides can be adjusted manually in the widthwise direction. The original document guides are disposed on an original document supporting surface of the original document tray on which the original document is placed, and the manual-feed sheet guides are disposed on a side opposite the original document supporting surface. The original document guides can also be moved manually in the widthwise direction and move in conjunction with the manual-feed sheet guides.

15 Claims, 8 Drawing Sheets

ORIGINAL DOCUMENT TRAY FOR SCANNING AND PRINTING APPARATUS

BACKGROUND OF THE INVENTION

1. Field of the Invention

The present invention relates to an original document tray for a scanning and printing apparatus that holds an original document to be introduced into a scanning unit of the scanning and printing apparatus.

2. Description of Related Art

As described in Japanese examined patent-application publication (kokoku) No. HEI-5-62335, a copying apparatus has a manual-feed tray formed in an original document tray by hollowing out the original document tray. A hand-fed paper is manually fed onto the manual-feed tray through the surface of the original document tray on which original documents are placed. A raised part is provided on both sides of the manual-feed tray for restricting the both side edges of the manual-feed paper. A slot is formed at a downstream end of the manual-feed tray, and a paper conveying path formed by a pair of guide plates is linked to the slot. The manual-feed tray occupies about two-thirds of the original document tray, while the remaining one-third is used as the original document tray.

SUMMARY OF THE INVENTION

However, forming a manual-feed tray in the original document tray in the above described conventional apparatus leads to an increase in the size of the original document tray. Further, since the raised portions are provided to regulate the widthwise ends of the manual-feed paper, different sizes of manual-feed paper cannot be regulated properly.

In view of the foregoing, it is an object of the present invention to provide an original document tray for a scanning and printing apparatus that is small in size and, moreover, is capable of guiding various sizes of manual-feed paper into a printing unit of the scanning and printing apparatus. It is another object of the present invention to provide a scanning and printing apparatus equipped with the original document tray.

In order to attain the above and other objects, the present invention provides an original document tray for feedingly supporting an original document and a manual-feed sheet. The original document has a surface and widthwise ends in a widthwise direction. The manual-feed sheet has a surface and widthwise ends in the widthwise direction. The original document tray includes an original document supporting portion, a manual-feed sheet supporting portion, a pair of original document guides, a pair of manual-feed sheet guides, and an adjusting portion. The original document supporting portion contacts the surface of the original document, thereby feedingly supporting the original document in a first widthwise position in the widthwise direction. The manual-feed sheet supporting portion contacts the surface of the manual-feed sheet, thereby feedingly supporting the manual-feed sheet in a second widthwise position in the widthwise direction. The manual-feed sheet supporting portion is in a superposed relationship to the original document supporting portion. The pair of original document guides is disposed on the original document supporting portion and contacts the widthwise ends of the original document, thereby determining the first widthwise position of the original document. The pair of original document guides is positioned in a first distance from each other in the widthwise direction. The pair of manual-feed sheet guides is disposed on the manual-feed sheet supporting portion and contacts the widthwise ends of the manual-feed sheet, thereby determining the second widthwise position of the manual-feed sheet. The pair of manual-feed sheet guides is positioned in a second distance from each other in the widthwise direction. The adjusting portion supports the pair of manual-feed sheet guides movably in the widthwise direction and adjusts the second distance between the pair of manual-feed sheet guides in the widthwise direction.

The present invention also provides a scanning and printing apparatus. The scanning and printing apparatus includes a scanning unit that scans images on an original document, a printing unit that prints images on a manual-feed sheet, and an original document tray for feedingly supporting the original document and the manual-feed sheet. The original document has a surface and widthwise ends in a widthwise direction. The manual-feed sheet has a surface and widthwise ends in the widthwise direction. The original document tray includes an original document supporting portion, a manual-feed sheet supporting portion, a pair of original document guides, a pair of manual-feed sheet guides, and an adjusting portion. The original document supporting portion contacts the surface of the original document, thereby feedingly supporting the original document in a first widthwise position in the widthwise direction. The original document supporting portion feeds the original document to the scanning unit in a first conveying direction. The manual-feed sheet supporting portion contacts the surface of the manual-feed sheet, thereby feedingly supporting the manual-feed sheet in a second widthwise position in the widthwise direction. The manual-feed sheet supporting portion is in a superposed relationship to the original document supporting portion. The manual-feed sheet supporting portion feeds the manual-feed sheet to the printing unit in a second conveying direction. The pair of original document guides is disposed on the original document supporting portion and contacts the widthwise ends of the original document, thereby determining the first widthwise position of the original document. The pair of original document guides is positioned in a first distance from each other in the widthwise direction. The pair of manual-feed sheet guides is disposed on the manual-feed sheet supporting portion and contacts the widthwise ends of the manual-feed sheet, thereby determining the second widthwise position of the manual-feed sheet. The pair of manual-feed sheet guides is positioned in a second distance from each other in the widthwise direction. The adjusting portion supports the pair of manual-feed sheet guides movably in the widthwise direction and adjusts the second distance between the pair of manual-feed sheet guides in the widthwise direction.

BRIEF DESCRIPTION OF THE DRAWINGS

The above and other objects, features and advantages of the invention will become more apparent from reading the following description of the preferred embodiments taken in connection with the accompanying drawings in which.

DETAILED DESCRIPTION OF THE PREFERRED EMBODIMENTS

Figure 1:
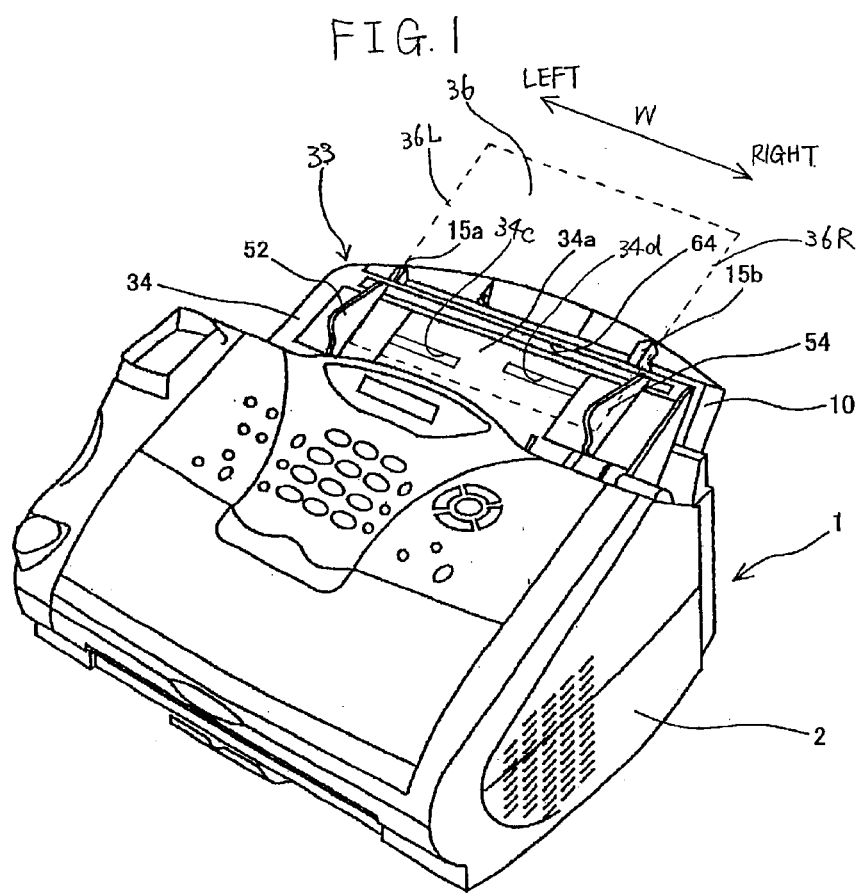
FIG. 1 is a perspective view of a scanning and printing apparatus according to a first embodiment of the present invention.

A scanning and printing apparatus according to preferred embodiments of the present invention will be described while referring to the accompanying drawings wherein like parts and components are designated by the same reference numerals to avoid duplicating description.

<First Embodiment>

A scanning and printing apparatus 1 according to a first embodiment of the present invention will be described with reference to FIGS. 1 through 5.

Figure 2:
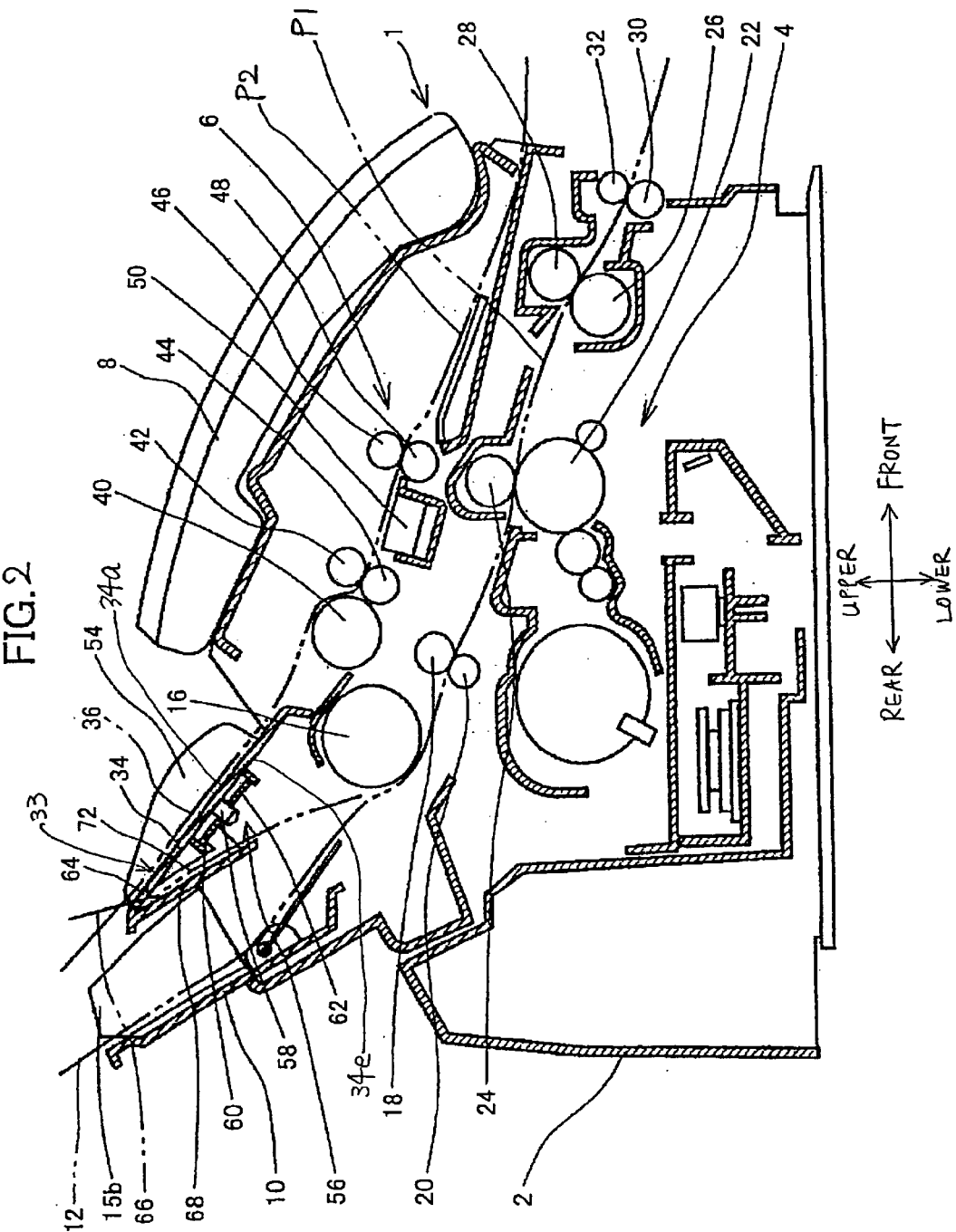
FIG. 2 is a side cross-sectional view of the scanning and printing apparatus according to the first embodiment.

As shown in FIGS. 1 and 2, the scanning and printing apparatus 1 includes a main casing 2 and a printing unit 4 accommodated in the main casing 2 (FIG. 2). A scanning unit 6 is disposed in a superposed relationship to the printing unit 4 for conveying and scanning an original document 36. A telephone receiver 8 (FIG. 2) is supported on top of the main casing 2. The scanning and printing apparatus 1 has functions of a telephone, a facsimile device, a copy machine, a printer, and a scanner.

A paper supply tray 10 is disposed on the rear side of the main casing 2 and accommodates sheets of a recording paper 12. The recording paper 12 is conveyed along a printing path P1 formed in the main casing 2 to be printed and is subsequently discharged through the front side of the main casing 2. A feeding roller 16 is disposed in front of the paper supply tray 10 along the printing path P1. The feeding roller 16 conveys the recording paper 12 stacked in the paper supply tray 10 onto the printing path P1 one sheet at a time. A pair of guides 15a and 15b is provided on the paper supply tray 10 for guiding the recording paper 12 by both side edges thereof. The guides 15a and 15b can be moved manually in the widthwise direction W (FIG. 1).

A pair of rollers 18 and 20 is disposed downstream of the feeding roller 16 in the conveying direction of the recording paper 12. The pair of rollers 18 and 20 supplies the recording paper 12 interposed therebetween to a printing drum 22 along the printing path P1. A transfer roller 24 is disposed in confrontation with the printing drum 22. The recording paper 12 becomes interposed between the printing drum 22 and the transfer roller 24 and is supplied by the same along the printing path P1 to a heating roller 26.

A pressure roller 28 is disposed in confrontation with the heating roller 26. The recording paper 12 becomes interposed between the heating roller 26 and the pressure roller 28 and is supplied by the same along the printing path P1 to a pair of discharge rollers 30 and 32. The discharge rollers 30 and 32 discharge the recording paper 12 from the printing path P1 out of the main casing 2.

An original document tray 33 is provided in front of the paper supply tray 10. The original document tray 33 includes an original document supporting portion 34 and a manual-feed sheet supporting portion 68. The manual-feed sheet supporting portion 68 is in a superposed relationship to the original document supporting portion 34. A plurality of sheets of an original document 36 is stacked on the original document supporting portion 34. The plurality of sheets of an original document 36 is conveyed along a scanning path P2 formed in the main casing 2 to be scanned and is subsequently discharged from the front side of the main casing 2. A separation roller 40 is provided in front of the original document supporting portion 34 along the scanning path P2. The separation roller 40 feeds the sheets of the original document 36 stacked on the original document supporting portion 34 into the scanning path P2 one sheet at a time.

A pair of feeding rollers 42 and 44 and a pair of discharge rollers 46 and 48 are disposed along the scanning path P2 downstream of the separation roller 40 in the conveying direction of the original document 36. An image sensor 50 is disposed between the pair of feeding rollers 42 and 44 and the pair of discharge rollers 46 and 48. The image sensor 50 scans the original document 36 conveyed along the scanning path P2. The discharge rollers 46 and 48 discharge the original document 36 from the main casing 2.

Figure 3:
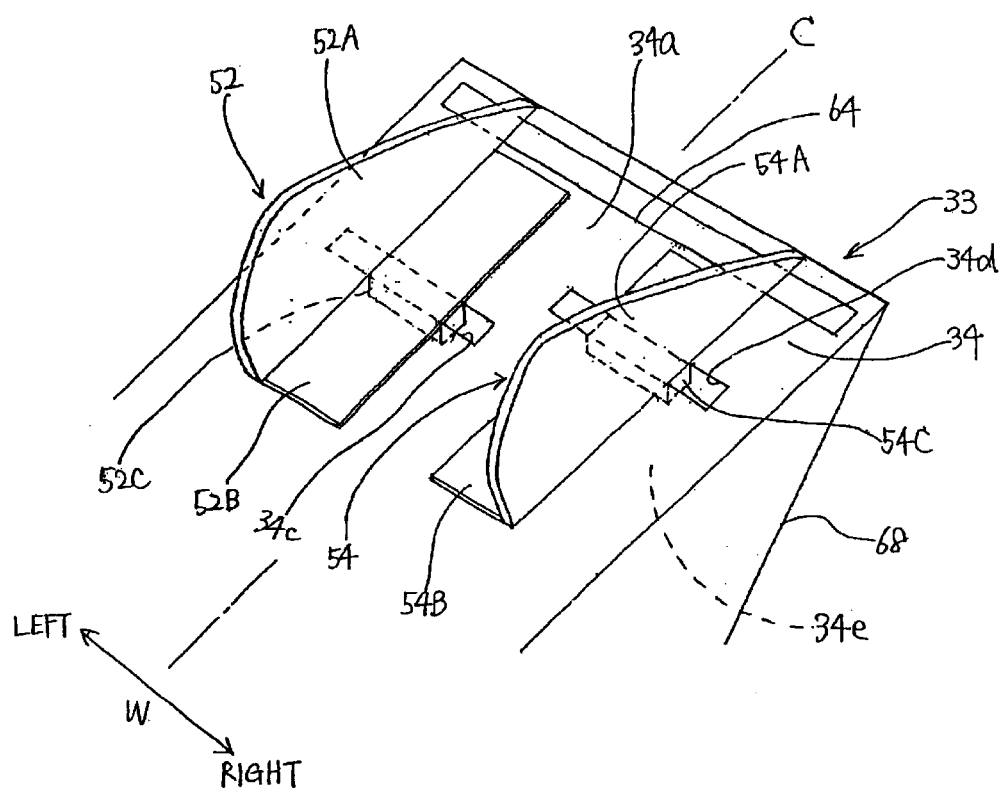
FIG. 3 is a perspective view of an original document tray according to the first embodiment.
Figure 4:
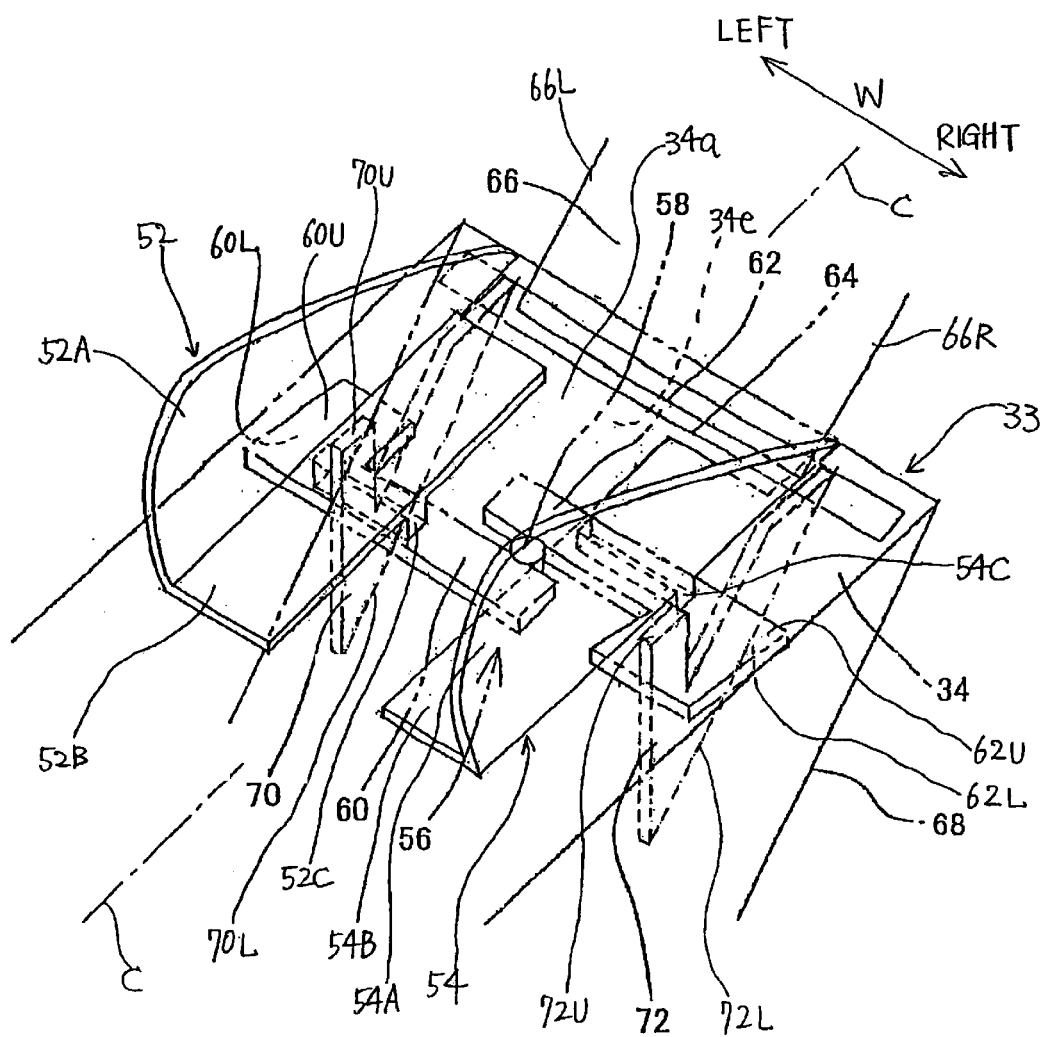
FIG. 4 is a perspective view of the original document tray including a pair of manual-feed sheet guides and an interlocking mechanism.

As shown in FIGS. 3 and 4, the original document tray 33 further includes a pair of original document guides 52 and 54, a pair of manual-feed sheet guides 70 and 72, and an interlocking mechanism 56 (FIG. 4). FIG. 3 is an explanatory perspective view showing an upper side of the original document supporting portion 34. The interlocking mechanism 56 and the manual-feed sheet guides 70 and 72 are not shown in FIG. 3. FIG. 4 is an explanatory perspective view showing the relationships among the original document guides 52 and 54, the interlocking mechanism 56, and the manual-feed sheet guides 70 and 72. The slotted through-holes 34c and 34d are not shown in FIG. 4 for simplicity of the drawing.

The original document supporting portion 34 has an original-document supporting surface 34a on which the original document 36 is placed, and an opposite surface 34e which is a surface opposite to the original-document supporting surface 34a. Slotted through-holes 34c and 34d are formed on the original document supporting portion 34 (FIGS. 1 and 3). As shown in FIGS. 3 and 4, the original document guides 52 and 54 are disposed on the original document supporting portion 34. The left-side original document guide 52 has a guide portion 52A, a base portion 52B, and a connecting portion 52C. The guide portion 52A and the base portion 52B are flat plates and extend substantially orthogonal to each other. The connecting portion 52C protrudes downward from a lower surface of the base portion 52B, and is connected to a rack member 60 described later. The guide portion 52A, the base portion 52B, and the connecting portion 52C are formed integrally. Similarly, the right-side original document guide 54 has a guide portion 54A, a base portion 54B, and a connecting portion 54C. The left-side original document guide 52 and the right-side original document guide 54 have a symmetrical construction with regard to a central line C.

The base portions 52B and 54B extends parallel with the original-document supporting surface 34a and are contacting the original-document supporting surface 34a. The guide portions 52A and 54A are erected substantially perpendicular to the original-document supporting surface 34a and are capable of contacting the left and right widthwise ends or edges 36L and 36R (FIG. 1) of the original document 36 loaded on the original-document supporting surface 34a.

A manual-feed slot 64 is formed in the original-document supporting portion 34 near the rear-upper end (FIG. 2) of the original document supporting portion 34. The manual-feed slot 64 has a substantially elongated rectangular shape, such that the manual-feed paper 66 can be inserted through the manual-feed slot 64 to the side opposite the original-document supporting surface 34a. That is, the manual-feed slot 64 leads to the manual-feed sheet supporting portion 68, such that the manual-feed paper 66 is supplied onto the manual-feed sheet supporting portion 68 through the manual-feed slot 64.

As shown in FIG. 3, the guide portions 52A and 54A extend in the rear-upper direction such that the guide portions 52A and 54A overlap with the manual-feed slot 64.

As shown in FIG. 2, the manual-feed sheet supporting portion 68 is integrally provided with the original document supporting portion 34 on the same side as the opposite surface 34e, that is opposite the original-document supporting surface 34a. The manual-feed sheet supporting portion 68 extends from the rear-upper end of the original document supporting portion 34 toward the feeding roller 16. The manual-feed sheet guides 70 and 72 are disposed on the side of the opposite surface 34e of the original document supporting portion 34.

The manual-feed sheet supporting portion 68 is configured to guide a hand-fed or manual-feed paper 66 inserted through the manual-feed slot 64 toward the printing path P1, such that the feeding roller 16 can feed the hand-fed paper 66 onto the printing path P1.

The relationships among the original document guides 52 and 54, the interlocking mechanism 56, and the manual-feed sheet guides 70 and 72 will be described with reference to FIGS. 3 and 4.

The original document guides 52 and 54 are positioned on an upper side of the original document supporting portion 34, which is the same side as the original-document supporting surface 34a. On the other hand, the interlocking mechanism 56 and the manual-feed sheet guides 70 and 72 are positioned on a lower side of the original document supporting portion 34, which is the same side as the opposite surface 34e.

The interlocking mechanism 56 includes a gear 58 and a pair of rack members 60 and 62. The original document guides 52 and 54 are fixed to the rack members 60 and 62 respectively. More specifically, the connecting portions 52C and 54C of the original document guides 52 and 54 are fitted into the slotted through-holes 34c and 34d (FIG. 3), and protrude downward to the opposite side of the original-document supporting surface 34a. The connecting portions 52C and 54C are fixed to upper surfaces 60U and 62U of the rack members 60 and 62 by screws (not shown) respectively.

The rack members 60 and 62 are fixed to the manual-feed sheet guides 70 and 72 respectively. More specifically, lower surfaces 60L and 62L of the rack members 60 and 62 are fixed to upper surfaces 70U and 72U of the manual-feed sheet guides 70 and 72 by screws (not shown).

The manual-feed sheet guides 70 and 72 are provided substantially perpendicular to the manual-feed sheet supporting portion 68. Lower surfaces 70L and 72L of the manual-feed sheet guides 70 and 72 contact the manual-feed sheet supporting portion 68, but are not fixed to the manual-feed sheet supporting portion 68, such that the manual-feed sheet guides 70 and 72 can move in the widthwise direction W. The manual-feed sheet guides 70 and 72 guide the hand-fed paper 66 along the manual-feed sheet supporting portion 68 by restricting the left and right widthwise ends 66L and 66R of the hand-fed paper 66 and determining a widthwise position of the hand-fed paper 66.

The guide portion 52A of the original document guide 52 and the manual-feed sheet guide 70 are at the same position in the widthwise direction W. Similarly, the guide portion 54A of the original document guide 54 and the manual-feed sheet guide 72 are at the same position in the widthwise direction W. Thus, a distance between the guide portion 52A and the guide portion 54A is the same as a distance between the manual-feed sheet guide 70 and the manual-feed sheet guide 72.

Accordingly, the original document guide 52, the rack member 60, and the manual-feed sheet guide 70 on the left side are all connected. Similarly, the original document guide 54, the rack member 62, and the manual-feed sheet guide 72 on the right side are all connected. Thus, the manual-feed sheet guides 70 and 72 move integrally or together with the original document guides 52 and 54, respectively, in the widthwise direction W.

In other words, the original document guides 52 and 54 and the manual-feed sheet guides 70 and 72, respectively, are supported on the original document supporting portion 34 so as to be movable in the widthwise direction W.

Next, the construction of the interlocking mechanism 56 will be described. The gear 58 is rotatably supported to the original document supporting portion 34. The rack members 60 and 62 are supported to the original document supporting portion 34 and movable in the widthwise direction W. The rack members 60 and 62 are engaged with the gear 58 on opposing sides of the gear 58.

Hence, if the original document guide 52 on the left side is moved toward the center (rightward), for example, the rack member 60 rotates the gear 58 in the counterclockwise direction. Accordingly, the gear 58 moves the rack member 62, together with the original document guide 54 and the manual-feed sheet guide 72, toward the center (leftward).

On the other hand, if the original document guide 52 on the left side is moved opposite the center (leftward), the rack member 60 rotates the gear 58 in the clockwise direction. Accordingly, the gear 58 moves the rack member 62, together with the original document guide 54 and the manual-feed sheet guide 72 opposite the center (rightward).

Accordingly, the rack members 60 and 62 and the gear 58 of the interlocking mechanism 56 move the original document guide 52 and the original document guide 54 in opposite directions. At this time, the manual-feed sheet guide 70 and the manual-feed sheet guide 72 move in the opposite directions integrally with the original document guide 52 and the original document guide 54, respectively.

In other words, the interlocking mechanism 56 links the manual-feed sheet guides 70 and 72, such that the manual-feed sheet guides 70 and 72 move simultaneously in opposite directions in the widthwise direction W. The original document guides 52 and 54, together with the manual-feed sheet guides 70 and 72, move toward and away from each other in the widthwise direction W for adjusting both the distance between the guide portions 52A and 54A and the distance between the manual-feed sheet guides 70 and 72. The interlocking mechanism 56 maintains a relationship that a distance between the guide portion 52A and the central line C is equal to a distance between the guide portion 54A and the central line C.

As described earlier, the guide portion 52A of the original document guide 52 and the manual-feed sheet guide 70 are at the same position in the widthwise direction W. Similarly, the guide portion 54A of the original document guide 54 and the manual-feed sheet guide 72 are at the same position in the widthwise direction W. Thus, the distance between the guide portion 52A and the central line C is equal to a distance between the manual-feed sheet guide 70 and the central line C. Similarly, the distance between the guide portion 54A and the central line C is equal to a distance between the manual-feed sheet guide 72 and the central line C.

Next, the operations of the scanning and printing apparatus 1 according to the first embodiment will be described.

As shown in FIG. 2, in the printing unit 4, the feeding roller 16 supplies the recording paper 12 loaded on the paper supply tray 10 one sheet at a time onto the printing path P1. The pair of rollers 18 and 20 subsequently conveys the recording paper 12 to the printing drum 22. Toner (not shown) is transferred onto the recording paper 12 by the printing drum 22 and fixed by the heating roller 26.

After printing is completed, the discharge rollers 30 and 32 discharge the recording paper 12 from the main casing 2. In the present embodiment, the direction for conveying the recording paper 12 and the hand-fed paper 66 along the printing path P1 and the direction for conveying the original document 36 along the scanning path P2 are substantially the same, that is, from the rear side of the main casing 2 toward the front side of the main casing 2.

The original document 36 is feedingly supported on the original document supporting portion 34. The guide portions 52A and 54A contact the widthwise ends 36L and 36R (FIG. 1) of the original document 36, and determine the widthwise position of the original document 36 by restricting movement in the widthwise direction W.

In the scanning unit 6, the separation roller 40 supplies the original document 36 loaded on the original document supporting portion 34 one sheet at a time onto the scanning path P2. The feeding rollers 42 and 44 and the discharge rollers 46 and 48 subsequently convey the original document 36 along the scanning path P2, while the image sensor 50 performs a scanning operation on the original document 36. The discharge rollers 46 and 48 then discharge the original document 36 from the main casing 2.

When the original document 36 is loaded onto the original document supporting portion 34, the original document guides 52 and 54 are manually adjusted such that the distance between the guide portions 52A and 54A matches the width of the original document 36, and such that the guide portions 52A and 54A contact the widthwise ends 36L and 36R of the original document 36. In this way, the original document guides 52 and 54 determine or restrict a widthwise position of the original document 36 in the widthwise direction W when the original document 36 is supplied onto the scanning path P2.

When printing on the hand-fed paper 66, on the other hand, the hand-fed paper 66 is inserted through the manual-feed slot 64 onto the manual-feed sheet supporting portion 68. The hand-fed paper 66 is feedingly supported on the manual-feed sheet supporting portion 68. The manual-feed sheet guides 70 and 72 contact the widthwise ends 66L and 66R of the hand-fed paper 66, and determine the widthwise position of the hand-fed paper 66 by restricting movement in the widthwise direction W. The feeding roller 16 conveys the hand-fed paper 66 onto the printing path P1. Toner is transferred onto the hand-fed paper 66 by the printing drum 22 and fixed by the heating roller 26. The discharge rollers 30 and 32 then discharge the hand-fed paper 66 from the main casing 2.

When inserting the hand-fed paper 66 through the manual-feed slot 64, the original document guides 52 and 54 are manually adjusted in the widthwise direction W, such that the distance between the manual-feed sheet guides 70 and 72 matches the width of the hand-fed paper 66, and such that the manual-feed sheet guides 70 and 72 contact the widthwise ends 66L and 66R of the hand-fed paper 66. In this way, the manual-feed sheet guides 70 and 72 determine or restrict a widthwise position of the hand-fed paper 66 in the widthwise direction W when the hand-fed paper 66 is supplied onto the printing path P1. Since the manual-feed sheet guides 70 and 72 are on the side opposite the original-document supporting surface 34a, it is difficult for a user to visually verify the positions of the manual-feed sheet guides 70 and 72. However, the positions of the manual-feed sheet guides 70 and 72 can be verified by the positions of the original document guides 52 and 54, because the manual-feed sheet guides 70 and 72 move integrally with the original document guides 52 and 54 respectively, and because the distance between the guide portions 52A and 54A is equal to the distance between the manual-feed sheet guides 70 and 72.

Accordingly, by adjusting the distance between the original document guides 52 and 54 to the width of the hand-fed paper 66, the distance between the left and right manual-feed sheet guides 70 and 72 conforms to the width of the hand-fed paper 66. Hence, the left and right manual-feed sheet guides 70 and 72 can be easily adjusted in this way. Further, by providing the left and right manual-feed sheet guides 70 and 72 on the original document supporting portion 34, the manual-feed sheet supporting portion 68 and the manual-feed sheet guides 70 and 72 can be provided even in a small space between the paper supply tray 10 and the original document supporting portion 34, thereby reducing the size of the scanning and printing apparatus 1.

In the scanning and printing apparatuses 1 described above, the manual-feed sheet guides 70 and 72 are provided on the original document tray 33, enabling the original document tray 33 to be manufactured in a compact construction and the original document tray 33 that can be adjusted to the size of the hand-fed paper 66. The construction can be made more compact by disposing the manual-feed sheet guides 70 and 72 on the opposite side of the original-document supporting surface 34a.

The scanning and printing apparatus 1 is constructed such that the printing path P1 and the scanning path P2 are substantially parallel. The direction in which the original document 36 is conveyed along the scanning path P2 and the direction in which the hand-fed paper 66 is conveyed along the printing path P1 are the same, that is, from rear to front of the scanning and printing apparatus 1. By constructing the scanning and printing apparatus 1 as described above, a space-efficient layout is achieved. Accordingly, the construction can be made even more compact.

Figure 5:
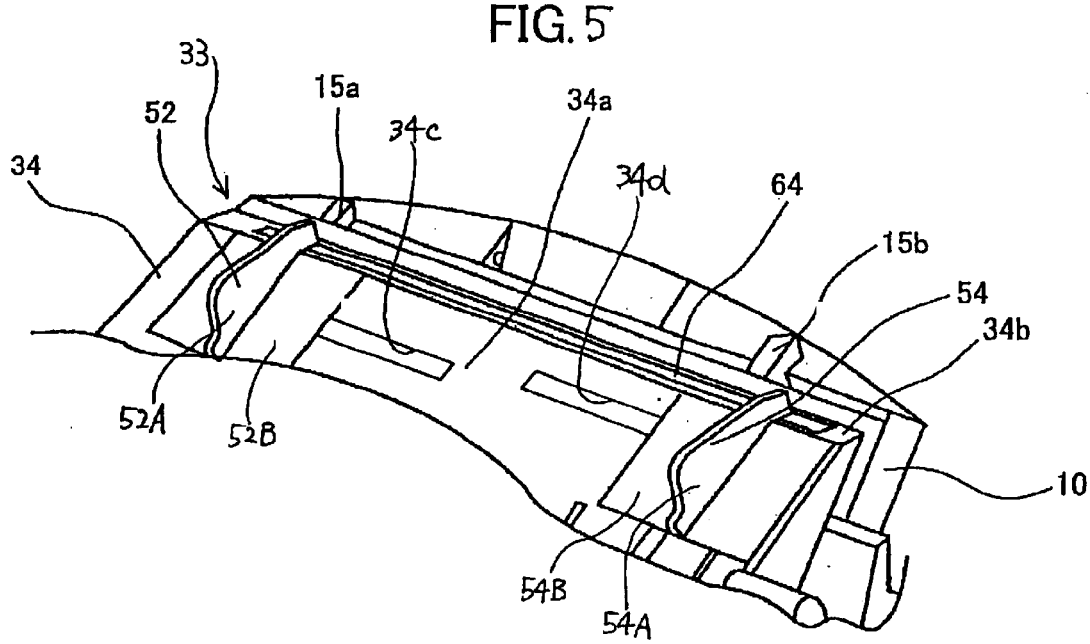
FIG. 5 is a perspective view of an original document tray according to a modification of the first embodiment.

According to the scanning and printing apparatus 1 in the first embodiment described above, the manual-feed slot 64 is formed in the original-document supporting surface 34a. However, the manual-feed slot 64 is not necessarily formed in the original-document supporting surface 34a. As shown in FIG. 5, for example, a non-document-holding surface 34b can be provided to form a predetermined angle with the original-document supporting surface 34a. In other words, the non-document-holding surface 34b can be formed by bending the rear-upper end (FIG. 2) of the original document supporting portion 34 in a downward slant. The manual-feed slot 64 can be formed in the non-document-holding surface 34b. In this modification, it is easy for a user to insert the hand-fed paper 66 in the manual-feed slot 64, because the non-document-holding surface 34b forms the predetermined angle with the original-document supporting surface 34a.

In the scanning and printing apparatus 1 in the first embodiment described above, the manual-feed sheet guides 70 and 72 are fixed to the rack members 60 and 62. However, the manual-feed sheet guides 70 and 72 are not necessarily fixed to the rack members 60 and 62, but can be supported on the original document supporting portion 34 so as to be movable in the widthwise direction W, without being fixed to the rack members 60 and 62. Further, the manual-feed sheet guides 70 and 72 can be fixed directly to the original document guides 52 and 54 so as to move integrally with the same. Alternativlely, the manual-feed sheet guides 70 and 72 can be configured to move independently from the original document guides 52 and 54.

In the scanning and printing apparatus 1 described above, the original document guides 52 and 54 are fixed to the rack members 60 and 62 by the screws. However, fasteners such as snapfit can also be used to fix the original document guides 52 and 54 to the rack members 60 and 62 respectively.

In the scanning and printing apparatus 1 described above, the rack members 60 and 62 are fixed to the manual-feed sheet guides 70 and 72 by the screws. However, fasteners such as snapfit can also be used to fix the rack members 60 and 62 to the manual-feed sheet guides 70 and 72 respectively. It is also possible to form integrally the rack member 60 and the manual-feed sheet guide 70 and to form integrally the rack member 62 and the manual-feed sheet guide 72.

In the scanning and printing apparatus 1 described above, the connecting portion 52C is integrally formed with the guide portion 52A and the base portion 52B. The connecting portion 54C is integrally formed with the guide portion 54A and the base portion 54B. However, the connecting portion 52C can be separately provided and fixed to the base portion 52B. Similarly, the connecting portion 54C can be separately provided and fixed to the base portion 54B.

In the scanning and printing apparatus 1 described above, the distance between the guide portion 52A and the guide portion 54A is the same as the distance between the manual-feed sheet guide 70 and the manual-feed sheet guide 72. However, the distance between the guide portion 52A and the guide portion 54A may be different from the distance between the manual-feed sheet guide 70 and the manual-feed sheet guide 72.

<Second Embodiment>

A scanning and printing apparatus 101 according to a second embodiment of the present invention will be described with reference to FIGS. 6 through 8.

Figure 6:
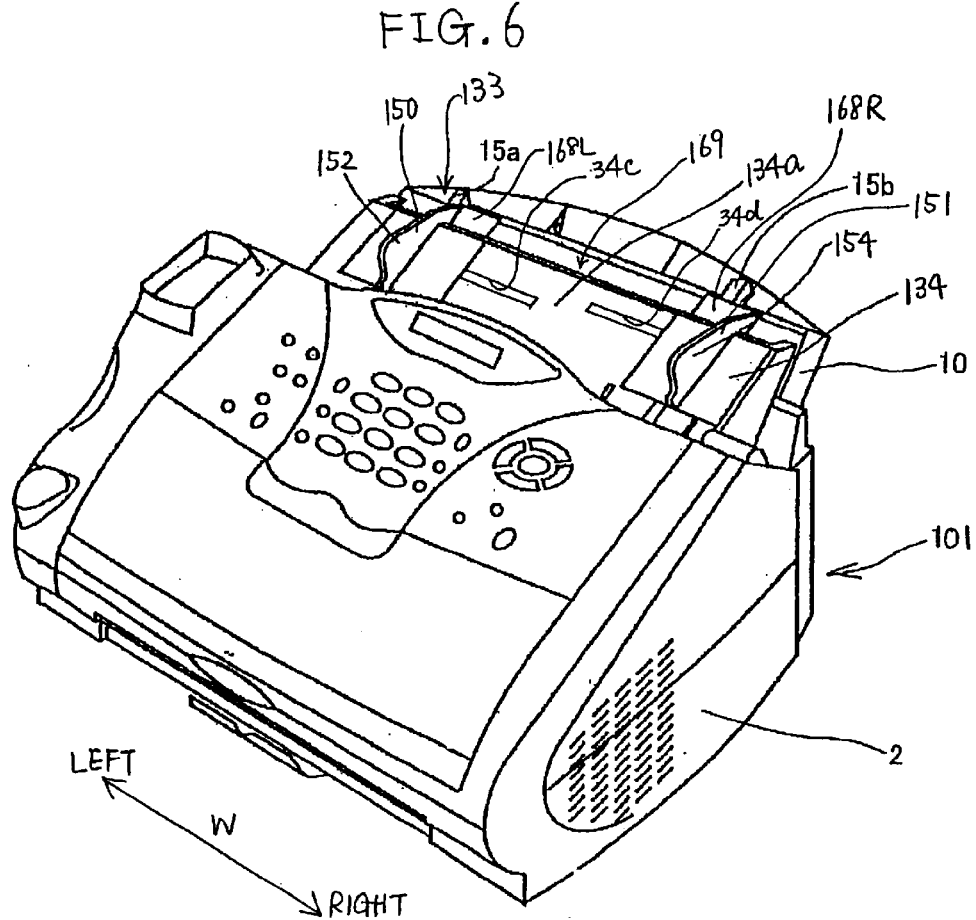
FIG. 6 is a perspective view of a scanning and printing apparatus according to a second embodiment of the present invention.
Figure 7:
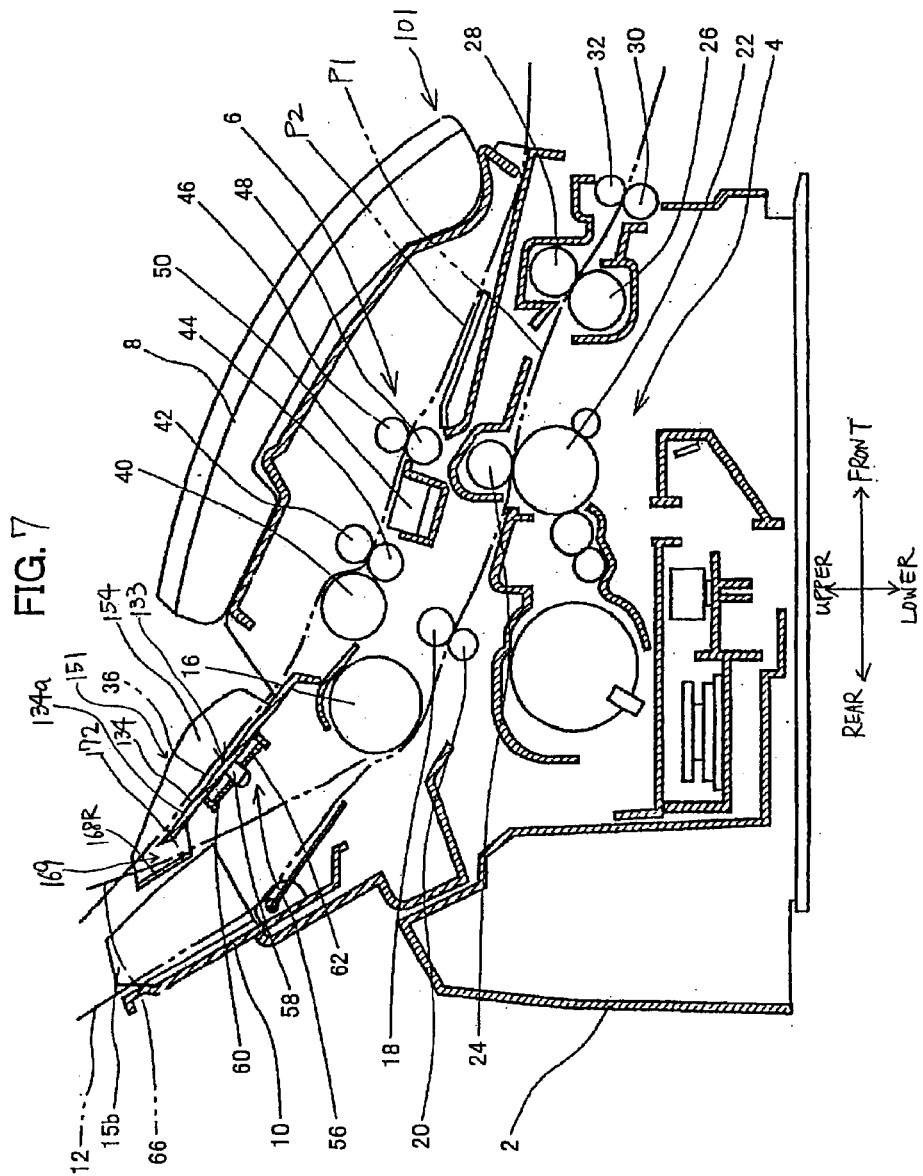
FIG. 7 is a side cross-sectional view of the scanning and printing apparatus according to the second embodiment.
Figure 8:
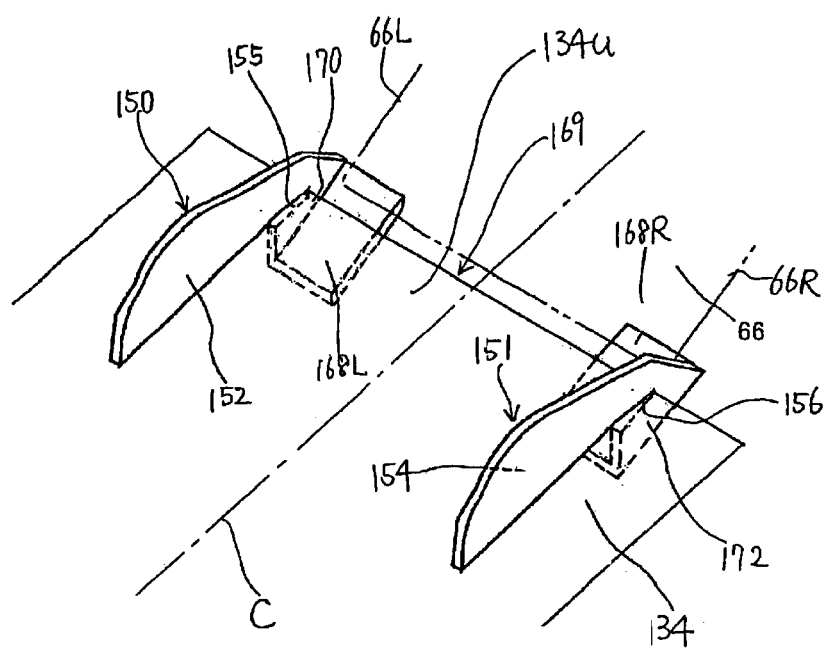
FIG. 8 is a perspective view of an original document tray according to the second embodiment.

As shown in FIGS. 6 and 7, in the scanning and printing apparatus 101, an original document tray 133 includes an original document supporting portion 134, a left-side guide unit 150, and a right-side guide unit 151. The original document supporting portion 134 is formed with a original-document supporting surface 134a on which an original document is placed. As shown in FIG. 8, a left-side guide unit 150 includes an original document guide 152, a manual-feed sheet guide 170, and a paper surface support portion 168L, all of which are integrally formed. The original document guide 152 and the manual-feed sheet guide 170 form approximately a J-shape or hook shape with a concave portion 155 that is positioned between the original document guide 152 and the manual-feed sheet guide 170. The paper surface support portion 168L extends substantially in a direction orthogonal to the original document guide 152 and the manual-feed sheet guide 170, that is, in a direction toward the center of the scanning and printing apparatus 101 (central line C).

Similarly, a right-side guide unit 151 includes an original document guide 154, a manual-feed sheet guide 172, and a paper surface support portion 168R. The left-side guide unit 150 and the right-side guide unit 151 have a symmetrical construction with regard to the central line C.

The guide units 150 and 151 are fixed to the original document supporting portion 134, such that the original document supporting portion 134 is fitted in the concave portions 155 and 156 of the guide units 150 and 151. Thus, the original document guides 152 and 154 are positioned on an upper side of the original document supporting portion 134, while the manual-feed sheet guides 170 and 172 and the paper surface support portions 168L and 168R are positioned on a lower side of the original document supporting portion 134. In other words, the original document guides 152 and 154 are positioned on the same side of the original-document supporting surface 134a, while the manual-feed sheet guides 170 and 172 and the paper surface support portions 168L and 168R are positioned on the opposite side of the original-document supporting surface 134a.

The paper surface support portions 168L and 168R are flat plates, and are provided at a slant in a front-lower direction (FIG. 7), so that the hand-fed paper 66 placed on the paper surface support portions 168L and 168R can be guided toward the feeding roller 16 and supplied onto the printing path P1.

In the second embodiment, the original document guides 152 and 154 are fixed to the rack members 60 and 62 of the interlocking mechanism 56 (FIG. 4) through the slotted through-holes 34c and 34d. Similarly in the first embodiment, connecting portions (not shown) are provided on the guide units 150 and 151, and the connecting portions are fixed to the rack members 60 and 62. By manually adjusting the original document guides 152 and 154, a distance between the manual-feed sheet guides 170 and 172 can be adjusted to the width of the hand-fed paper 66. When one of the original document guides 152 and 154 is moved, the other also moves due to the interlocking mechanism 56, enabling the original document guides 152 and 154 to be adjusted at equal distances from the center (central line C) of the apparatus 101 by moving only one of the original document guides 152 and 154.

An opening 169 is formed surrounded by the original document supporting portion 134, the manual-feed sheet guides 170 and 172, and the paper surface support portions 168L and 168R. The hand-fed paper 66 is inserted in the opening 169 and placed on the paper surface support portions 168L and 168R. The surfaces near the widthwise ends 66L and 66R of the hand-fed paper 66 are feedingly supported by the paper surface support portions 168L and 168R. The manual-feed sheet guides 170 and 172 guide the hand-fed paper 66 toward the feeding roller 16 by restricting movement of the hand-fed paper 66 in the widthwise direction W and determining a widthwise position of the hand-fed paper 66. The rotation of the feeding roller 16 supplies the hand-fed paper 66 onto the printing path P1 so that a printing process can be performed on the hand-fed paper 66.

In the scanning and printing apparatus 101 according to the second embodiment, the hand-fed paper 66 can be inserted into the scanning and printing apparatus 101 without requiring the manual-feed slot 64 and the manual-feed sheet supporting portion 68, thereby achieving a compact and simple construction. Further, by forming paper surface support portions 168L and 168R on the guide units 150 and 151, a separate manual-feed tray is unnecessary, thereby enabling a compact construction.

While the invention has been described in detail with reference to the specific embodiment thereof, it would be apparent to those skilled in the art that various changes and modifications may be made therein without departing from the spirit of the invention.

What is claimed is:

1. An original document tray for feedingly supporting an original document and a manual-feed sheet, the original document having a surface and widthwise ends in a widthwise direction, the manual-feed sheet having a surface and widthwise ends in the widthwise direction, the original document tray comprising:

an original document supporting portion contacting the surface of the original document, thereby feedingly supporting the original document in a first widthwise position in the widthwise direction;

a manual-feed sheet supporting portion contacting the surface of the manual-feed sheet, thereby feedingly supporting the manual-feed sheet in a second widthwise position in the widthwise direction, the manual-feed sheet supporting portion being in a superposed relationship to the original document supporting portion;

a pair of original document guides disposed on the original document supporting portion and contacting the widthwise ends of the original document, thereby determining the first widthwise position of the original document, the pair of original document guides being positioned in a first distance from each other in the widthwise direction;

a pair of manual-feed sheet guides disposed on the manual-feed sheet supporting portion and contacting the widthwise ends of the manual-feed sheet, thereby determining the second widthwise position of the manual-feed sheet, the pair of manual-feed sheet guides being positioned in a second distance from each other in the widthwise direction; and an adjusting portion supporting the pair of manual-feed sheet guides movably in the widthwise direction and adjusting the second distance between the pair of manual-feed sheet guides in the widthwise direction.

2. The original document tray as claimed in claim 1, wherein the original document supporting portion has a first side serving as an original document supporting surface, and a second side opposite to the first side, the original document supporting surface contacting the surface of the original document, wherein the pair of original document guides are disposed on the first side of the original document supporting portion, and wherein the pair of manual-feed sheet guides are disposed on the second side of the original document supporting portion.

3. The original document tray as claimed in claim 1, further comprising:

a connecting portion connecting one of the pair of original document guides with a corresponding one of the pair of manual-feed sheet guides, thereby allowing the one of the pair of original document guides to move together with the corresponding one of the pair of manual-feed sheet guides; and another connecting portion connecting a remaining one of the pair of original document guides with a corresponding remaining one of the pair of manual-feed sheet guides, thereby allowing the remaining one of the pair of original document guides to move together with the corresponding remaining one of the pair of manual-feed sheet guides.

4. The original document tray as claimed in claim 3, wherein the first distance between the pair of original document guides is substantially equal to the second distance between the pair of the manual-feed sheet guides.

5. The original document tray as claimed in claim 3, wherein the one of the pair of original document guides and the corresponding one of the pair of manual-feed sheet guides are integrally formed, and wherein the remaining one of the pair of original document guides and the corresponding remaining one of the pair of manual-feed sheet guides are integrally formed.

6. The original document tray as claimed in claim 1, wherein the manual-feed sheet supporting portion includes a pair of manual-feed sheet surface support portions integrally formed with the pair of manual-feed sheet guides, the pair of manual-feed sheet surface support portions contacting the surface of the manual-feed sheet and feedingly supporting the manual-feed sheet.

7. The original document tray as claimed in claim 1, wherein the original document supporting portion has a manual-feed opening that leads to the manual-feed sheet supporting portion, thereby allowing the manual-feed sheet to be supplied onto the manual-feed sheet supporting portion through the manual-feed opening.

8. The original document tray as claimed in claim 7, wherein the original document supporting portion has a original document supporting surface that contacts the surface of the original document and supports the original document, and wherein the manual-feed opening is formed in the original document supporting surface.

9. The original document tray as claimed in claim 7, wherein the original document supporting portion has:

a original document supporting surface contacting the surface of the original document and feedingly supporting the original document; and another surface forming a predetermined angle with the original document supporting surface, and wherein the manual-feed opening is formed in the another surface.

10. The original document tray as claimed in claim 1, wherein the adjusting portion includes an interlocking mechanism linking the pair of manual-feed sheet guides, thereby allowing the pair of manual-feed sheet guides moves simultaneously in the widthwise direction.

11. The original document tray as claimed in claim 10, wherein the interlocking mechanism includes:

a pair of rack members, each of the pair of rack members being connected to a corresponding one of the pair of manual-feed sheet guides, each of the pair of rack members being movable in the widthwise direction and supported to the original document supporting portion; and a gear member rotatably supported to the original document supporting portion and engaging both of the pair of rack members for moving the pair of rack members in opposite directions.

12. The original document tray as claimed in claim 11, further comprising:

a connecting portion connecting one of the pair of original document guides with a corresponding one of the pair of manual-feed sheet guides, thereby allowing the one of the pair of original document guides to move together with the corresponding one of the pair of manual-feed sheet guides; and another connecting portion connecting a remaining one of the pair of original document guides with a corresponding remaining one of the pair of manual-feed sheet guides, thereby allowing the remaining one of the pair of original document guides to move together with the corresponding remaining one of the pair of manual-feed sheet guides.

13. The original document tray as claimed in claim 12, wherein the connecting portion connects the one of the pair of original document guides with a corresponding one of the pair of rack members, the corresponding one of the pair of rack members being connected to the corresponding one of the pair of manual-feed sheet guides, and wherein the another connecting portion connects the remaining one of the pair of original document guides with a corresponding remaining one of the pair of rack members, the corresponding remaining one of the pair of rack members being connected to the corresponding remaining one of the pair of manual-feed sheet guides, thereby allowing the pair of original document guides to move toward and away from each other in the widthwise direction for adjusting both the first distance between the pair of original document guides and the second distance between the pair of manual-feed sheet guides.

14. A scanning and printing apparatus comprising:

a scanning unit scanning images on an original document;

a printing unit printing images on a manual-feed sheet; and an original document tray for feedingly supporting the original document and the manual-feed sheet, the original document having a surface and widthwise ends in a widthwise direction, the manual-feed sheet having a surface and widthwise ends in the widthwise direction, the original document tray including:

an original document supporting portion contacting the surface of the original document, thereby feedingly supporting the original document in a first widthwise position in the widthwise direction, the original document supporting portion feeding the original document to the scanning unit in a first conveying direction;

a manual-feed sheet supporting portion contacting the surface of the manual-feed sheet, thereby feedingly supporting the manual-feed sheet in a second widthwise position in the widthwise direction, the manual-feed sheet supporting portion being in a superposed relationship to the original document supporting portion, the manual-feed sheet supporting portion feeding the manual-feed sheet to the printing unit in a second conveying direction;

a pair of original document guides disposed on the original document supporting portion and contacting the widthwise ends of the original document, thereby determining the first widthwise position of the original document, the pair of original document guides being positioned in a first distance from each other in the widthwise direction;

a pair of manual-feed sheet guides disposed on the manual-feed sheet supporting portion and contacting the widthwise ends of the manual-feed sheet, thereby determining the second widthwise position of the manual-feed sheet, the pair of manual-feed sheet guides being positioned in a second distance from each other in the widthwise direction; and an adjusting portion supporting the pair of manual-feed sheet guides movably in the widthwise direction and adjusting the second distance between the pair of manual-feed sheet guides in the widthwise direction.

15. The scanning and printing apparatus as claimed in claim 14, wherein the scanning unit is disposed in another superposed relationship to the printing unit, and wherein the first conveying direction and the second conveying direction are substantially the same.

* * * * *